(12) United States Patent
Yoshida

(10) Patent No.: US 9,649,735 B2
(45) Date of Patent: May 16, 2017

(54) MACHINE TOOL

(71) Applicant: Okuma Corporation, Niwa-Gun (JP)

(72) Inventor: Makoto Yoshida, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 514 days.

(21) Appl. No.: 14/203,938

(22) Filed: Mar. 11, 2014

(65) Prior Publication Data
US 2014/0312548 A1 Oct. 23, 2014

(30) Foreign Application Priority Data

Apr. 22, 2013 (JP) ................. 2013-089528

(51) Int. Cl.
B23Q 1/48 (2006.01)
B23Q 5/10 (2006.01)

(52) U.S. Cl.
CPC ............ *B23Q 1/48* (2013.01); *B23Q 1/4852* (2013.01); *B23Q 5/10* (2013.01); *B23Q 2220/004* (2013.01); *Y10T 409/305824* (2015.01)

(58) Field of Classification Search
CPC ... B23Q 1/50; B23Q 1/48; B23Q 1/40; B23Q 2220/004; B23Q 1/4852; B23Q 5/10; F16C 19/36; F16C 33/60; F16H 25/04; Y10T 409/305824
USPC ..................... 269/57, 58; 409/168
See application file for complete search history.

(56) References Cited

U.S. PATENT DOCUMENTS

| 3,910,159 A * | 10/1975 | Gladwin .................. B23C 3/13 409/118 |
| 7,645,103 B2 * | 1/2010 | Schmidt ................. B23Q 1/012 269/58 |
| 2002/0050439 A1* | 5/2002 | Watanabe ................ B23Q 1/48 198/346.1 |
| 2008/0175684 A1* | 7/2008 | Schmidt ................. B23Q 1/012 409/212 |
| 2009/0238655 A1 | 9/2009 | Schmidt et al. |
| 2009/0283950 A1* | 11/2009 | Bernhard ................. B23Q 1/28 269/59 |

(Continued)

FOREIGN PATENT DOCUMENTS

CN 102756282 A 10/2012
JP 2003-311565 A1 11/2003
(Continued)

OTHER PUBLICATIONS

Japanese Office Action (Application No. 2013-089528) mailed Oct. 4, 2016 (with English translation).

(Continued)

*Primary Examiner* — Larry E. Waggle, Jr.
*Assistant Examiner* — Mahdi H Nejad
(74) *Attorney, Agent, or Firm* — Burr & Brown, PLLC

(57) ABSTRACT

A machine tool includes a slide table supported by an upper portion of a main body of the machine tool so as to be horizontally slidable, a rotary table provided on the slide table so as to be rotationally indexable about a vertical axis extending in the direction that is orthogonal to the direction of horizontal slide movement of the slide table, and a motor provided in the slide table to rotate the rotary table. A housing space is formed in the main body to house a lower portion of the slide table. At least a part of the motor provided in the slide table is placed in the housing space.

2 Claims, 3 Drawing Sheets

(56) References Cited

U.S. PATENT DOCUMENTS

2011/0233879 A1* 9/2011 Tullmann ................ B23Q 1/44
279/110
2012/0266783 A1* 10/2012 Yoshida ............... B23Q 1/4857
108/2

FOREIGN PATENT DOCUMENTS

| JP | 2003311565 | * 11/2003 |
| JP | 2012-228740 | 11/2012 |
| JP | 2013-509307 | 3/2013 |

OTHER PUBLICATIONS

Chinese Office Action, Chinese Application No. 201410147938.6, dated Dec. 28, 2016 (4 pages).

* cited by examiner

MACHINE TOOL

BACKGROUND OF THE INVENTION

This application claims the benefit of Japanese Patent Application Number 2013-089528 filed on Apr. 22, 2013, the entirety of which is incorporated by reference.

TECHNICAL FIELD

The present invention relates to a machine tool including a slide table supported by a main body of the machine tool so as to be horizontally slidable, and a rotary table provided on the slide table so as to be rotationally indexable about a vertical axis extending in a direction that is orthogonal to a direction of horizontal slide movement of the slide table.

BACKGROUND ART

Japanese Patent Application Publication No. 2003-311565 (JP 2003-311565 A), for example, discloses a transverse machining center including a rotary table that holds and rotates a workpiece, a slide table that rotatably supports the rotary table on an upper portion thereof, and a tool holder that holds a tool for machining the workpiece. The rotary table, the slide table, and the tool holder are relatively movable in three directions that are orthogonal to each other. In the transverse machining center according to JP 2003-311565 A, a bed having a T shape as viewed in plan is fixed to a floor surface, and a First guide rail and a second guide rail are provided on the bed along two directions that are orthogonal to each other. The first guide rail supports the tool holder so as to be horizontally slidable, and the second guide rail supports the slide table so as to be horizontally slidable. The slide table is horizontally slidable on the second guide rail above the bed. An input shaft is provided in the slide table. The input shaft is capable of inputting a rotational drive force to the rotary table. A plurality of roller cam gears are disposed on the outer periphery of the input shaft at equal intervals along the axial direction. In addition, a plurality of cam followers are disposed on a rotary shaft of the rotary table at equal intervals along the circumferential direction of the rotary shaft. The roller cam gears are meshed with the cam followers to transfer the rotational drive force to the rotary table so that the rotary table can be rotated. Besides, an input shall provided with a worm gear is provided in the slide table. The worm gear is meshed with a gear provided on the outer peripheral portion of the rotary shaft of the rotary table so that the rotational drive force of the input shaft is transferred to the rotary table.

SUMMARY OF THE INVENTION

In the machine tool represented by the transverse machining center described above, however, it is necessary that the slide table should be provided so as to be horizontally slidable on the second guide rail above the bed in order to support the slide table so as to be horizontally slidable on the bed. Therefore, the height from the floor surface to the upper surface of the rotary table supported by the slide table is determined by adding the height of the slide table to the height of the bed and the height of the second guide rail. This may increase the height of the machine tool, whereby the size of the machine tool may be increased.

In view of such circumstances, it is an object of the present invention to provide a machine tool, of which an increase in size can be suppressed.

A first aspect of the present invention provides a machine tool including a slide table, a rotary table, and a motor. The slide table is supported by an upper portion of a main body of the machine tool so as to be horizontally slidable. The rotary table is provided on the slide table so as to be rotationally indexable about a vertical axis extending in a direction that is orthogonal to a direction of horizontal slide movement of the slide table. The motor is provided in the slide table to rotate the rotary table. In the machine toot, a housing space is formed in the main body to house a lower portion of the slide table so that at least a part of the motor provided in the slide table is placed in the housing space.

A second aspect of the present invention provides the machine tool according to the first aspect, further including a pair of guide rails provided on the main body and disposed opposite to each other on outer sides of the housing space so that the slide table can be supported so as to be horizontally slidable. In the machine tool, a pair of the motors are disposed point-symmetrically about the vertical axis.

A third aspect of the present invention provides the machine tool according to the first aspect, in which the motor is a direct-drive motor directly coupled to the rotary table.

With the machine tool according to the first aspect of the present invention, the dimension between the main body and the upper surface of the rotary table provided on the slide table can be reduced because the lower portion of the slide table is housed in the housing space so that at least the part of the motor provided in the slide table is placed in the housing space. Accordingly, the size of the machine tool can be reduced.

According to the second aspect of the present invention, large rotational drive torque can be obtained by providing a pair of such motors, even in the case where the rotational drive torque of each motor is relatively small.

According to the third aspect sent invention, it is not necessary that the rotational drive torque of the motor should be transferred to the rotary table via a speed reduction mechanism, and therefore it is not necessary to provide an arrangement space for a speed reduction mechanism in the slide table. Hence, the size of the slide table can be reduced compared to a case where an arrangement space for a speed reduction mechanism is provided in the slide table, whereby the size of the machine tool can be further reduced.

DETAILED DESCRIPTION OF THE EMBODIMENTS

First Embodiment

Figure 1:
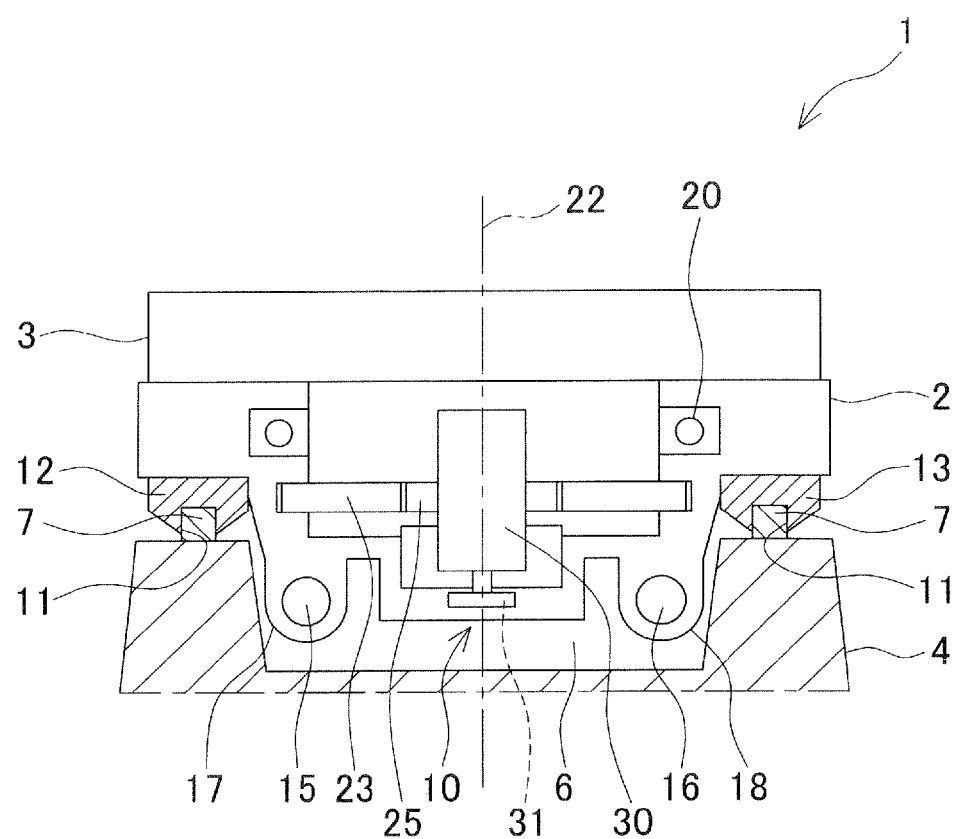
FIG. 1 is a schematic partial front sectional view of a machining center including a slide table having a rotary table according to a First embodiment of the present invention.

A first embodiment of the present invention will be described with reference to FIGS. 1 and 2. FIG. 1 illustrates a machining center 1 including a slide table 2 having a rotary table 3. The machining center 1 includes a bed 4 installed on a floor. A housing space 6 for the slide table 2 is formed in the bed 4. The housing space 6 is a recessed space with a generally U-shaped section that opens in the upper surface of the bed 4 on the upper side (upper side of FIG. 1), opens in the front surface (closer side) of the bed 4 on the front side (closer side of FIG. 1), and opens in the rear surface (farther side) of the bed 4 on the rear side (farther side of FIG. 1). Further, guide rails 7, 7 are provided on the upper surface of the bed 4 at the left end portion and the right end portion, which are on outer sides of the housing space 6. The guide rails 7, 7 extend in the front-rear direction of the bed 4 (closer-farther direction of FIG. 1). The guide rails 7, 7 are arranged opposite to each other in the left-right direction of the bed 4 (left-right direction of FIG. 1) to extend in parallel with each other. The machining center 1 is an example of the machine tool according to the present invention. The bed 4 is an example of the main body of the machine tool according to the present invention.

Figure 2:
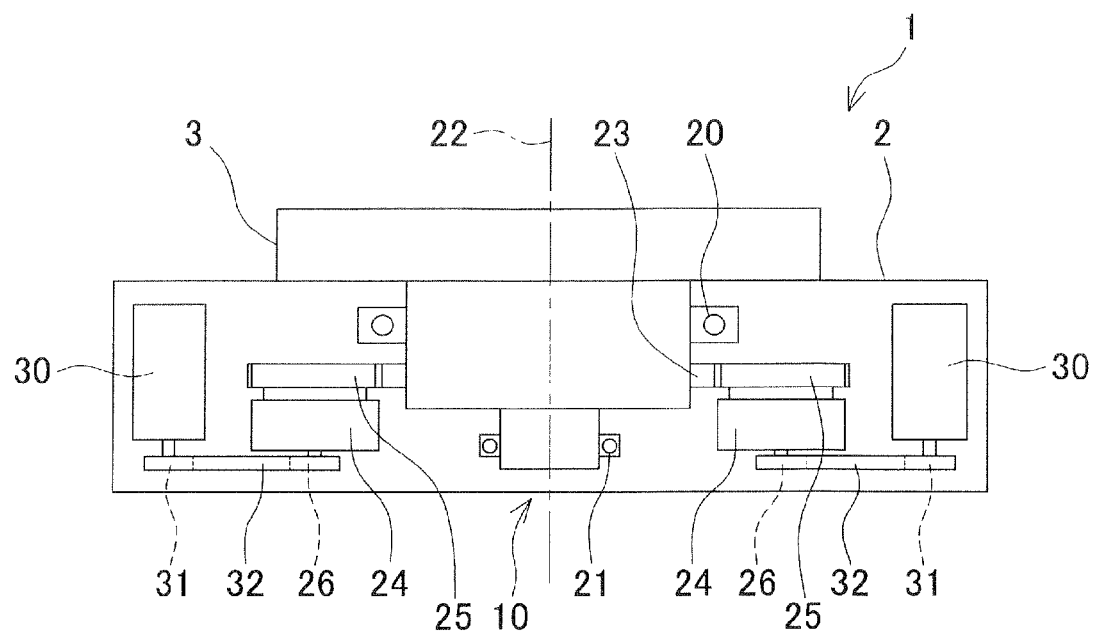
FIG. 2 is a schematic side view of the slide table illustrating an internal structure of the slide table.

In addition, as illustrated in FIGS. 1 and 2, the slide table 2 is formed with a projecting portion 10. The projecting portion 10 projects downward from the center portion of the slide table 2 over the entire length of the slide table 2 in the front-rear direction. As illustrated in FIG. 1, guide blocks 12 are fixed to the left end portion and the right end portion of the lower surface of the slide table 2, respectively, which are on the outer sides of the projecting portion 10. Slide grooves 11 are formed in the guide blocks 12, 13 to extend in the front-rear direction of the slide table 2 (closer-farther direction of FIG. 1). As illustrated in FIG. 1, the slide grooves 11 are slidably fitted with the guide rails 7. With the slide grooves 11 fitted with the guide rails 7, the projecting portion 10 of the slide table 2 is housed in the housing space 6.

Further, as illustrated in FIG. 1, in the housing space 6, a ball screw 15 is rotatably disposed in a left-side region on the outer side of the projecting portion 10 of the slide table 2 and extends in the front-rear direction of the bed 4, and a ball screw 16 is rotatably disposed in a right-side region on the outer side of the projecting portion 10 and extends in the front-rear direction of the bed 4. A ball screw nut portion 17 projects from the lower surface of the slide table 2 between the projecting portion 10 and the guide block 12. The ball screw nut portion 17 is housed in the housing space 6, and threadably engaged with the ball screw 15. In addition, a ball screw nut portion 18 projects from the lower surface of the slide table 2 between the projecting portion 10 and the guide block 13. The ball screw nut portion 18 is housed in the housing space 6, and threadably engaged with the ball screw 16. In the embodiment, a motor (not illustrated) rotates the ball screws 15, 16 to horizontally slide the ball screw nut portions 17, 18 of the slide table 2 in the axial direction of the ball screws 15, 16 (front-rear direction of the bed 4) in the housing space 6. Along with this movement, the projecting portion 10 is also horizontally slid in the front-rear direction in the housing space 6. Then, the slide grooves 11 of the slide table 2 slide along the guide rails 7, whereby the slide table 2 is horizontally slid in the front-rear direction of the bed 4.

As illustrated in FIGS. 1 and 2, the rotary table 3 is provided on the upper surface of the slide table 2. A workpiece is removably fixed to the upper surface of the rotary table 3. As illustrated in FIG. 2, the rotary table 3 is rotatably supported by bearings 20, 21 disposed at two levels in the upper-lower direction in the slide table 2. The rotary table 3 is rotated by 360 degrees about a vertical axis 22 that is orthogonal to the direction of horizontal slide of the slide table 2 (closer-farther direction of FIG. 1) so that the rotary table 3 is rotationally indexable. Further, a gear portion 23 is coaxially provided on the rotary table 3 in the projecting portion 10 between the bearings 20, 21 so as to be rotatable together with the rotary table 3. As illustrated in FIG. 2, a pair of speed reducers 24, 24 are disposed at both sides of the gear portion 23 (right and left sides of FIG. 2) in the projecting portion 10. The pair of speed reducers 24, 24 are placed symmetrically in right and left direction with respect to the vertical axis 22. The pair of speed reducers 24, 24 each include a gear 25 provided on an upper output shaft, and a pulley 26 provided on a lower input shaft. In addition, the gears 25, 25 are meshed with the gear portion 23. Each speed reducer 24 is internally provided with a planetary gear speed reduction mechanism known in the art.

In addition, as illustrated in FIG. 2, a pair of motors 30, 30 are disposed in the projecting portion 10 on the outer sides of the speed reduction mechanisms 24, 24 point-symmetrically in the front-rear direction of the projecting portion 10 about the vertical axis 22. Each motor 30 is disposed with its motor shaft directed downward. A pulley 31 is provided on each motor shaft. A belt 32 is stretched between each pulley 31 and the pulley 26 of each speed reducer 24 which is adjacent to the pulley 31. When the motors 30 are disposed in the projecting portion 10, the motors 30 are at least partially placed in the housing space 6 as the projecting portion 10 is housed in the housing space 6 as illustrated in FIG. 1.

In the machining center 1 according to the embodiment, when the motor shafts of the motors 30, 30 are rotated by a numerically controlled (NC) device (not illustrated), rotational drive torque of the motors 30 is transferred to the gear portion 23 of the rotary table 3 via the belts 32 and the speed reducers 24. This rotationally drives the rotary table 3. In this event, even in the case where the rotational drive torque of the motors 30 is relatively small, large rotational drive torque can be advantageously obtained by providing the pair of motors 30 disposed point-symmetrically in the front-rear direction of the projecting portion 10 about the vertical axis 22.

In the machining center 1 the workpiece fixed to the upper surface of the rotary table 3 is positioned at a desired machining position and machined by rotationally driving the rotary table 3 about the vertical axis 22 and horizontally sliding the slide table 2 in the front-rear direction of the bed 4. In the embodiment, as illustrated in FIG. 1, the housing space 6 is formed in the bed 4 to house the projecting portion 10 and the ball screw nut portions 17, 18 so as to be horizontally slidable in the front-rear direction. In such a case, the dimension between the upper surface of the bed 4 and the upper surface of the rotary table 3 can be reduced compared to a case where the housing space 6 is not formed in the bed 4 and the projecting portion 10 and the ball screw nut portions 17, 18 are disposed above the bed 4 to horizontally slide the slide table 2. Accordingly, the height of the machining center 1 can be reduced, which reduces the size of the machining center 1. Hence, the machining center 1 can be disposed even in a building with a low ceiling height. Further, the projecting portion 10 of the slide table 2 and the ball screw nut portions 17, 18 are housed in the housing space 6 of the bed 4 positioned below the slide table 2 to lower the position of the center of gravity of the slide table 2 compared to the related art. This suppresses transverse rolling (vibration) of the slide table 2 even in the case where a force is applied to the slide table 2.

Effects of First Embodiment

With the machining center 1 according to the embodiment, the dimension between the upper surface of the bed 4 and the upper surface of the rotary table 3 can be reduced because the projecting portion 10 of the slide table 2 is housed in the housing space 6 so that at least the parts of the motors 30 provided in the slide table 2 are placed in the housing space 6. Accordingly, the size of the machining center 1 can be reduced.

In addition, even in the case where the rotational drive torque of the motors 30 which rotationally drive the rotary table 3 is relatively small, large rotational drive torque can be obtained by providing the pair of motors 30 disposed point-symmetrically in the front-rear direction of the projecting portion 10 about the vertical axis 22.

Second Embodiment

Figure 3:
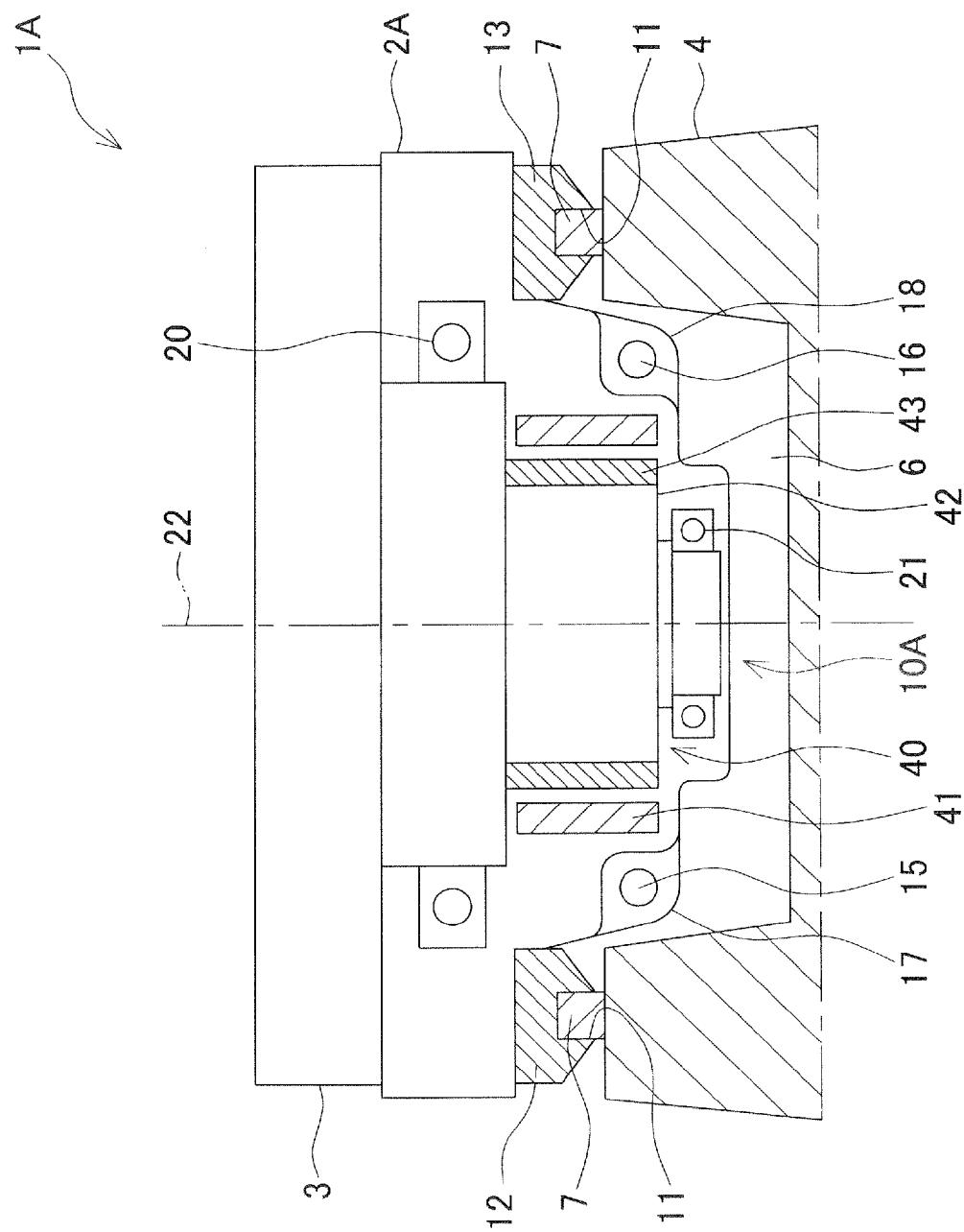
FIG. 3 is a schematic partial front sectional view of a machining center according to a second embodiment.

A second embodiment of the present invention will be described with reference to FIG. 3. The same components as those according to the first embodiment are denoted by the same reference numerals, and are not described here. In a machining center 1A illustrated in FIG. 3, a direct-drive motor 40 (hereinafter referred to as a "motor 40") is disposed in a vertical orientation in a projecting portion 10A of a slide table 2A. The motor 40 includes a stator 41 and a rotor 43. The stator 41 is formed in a generally cylindrical shape. Coils are wound around the stator 41. The rotor 43 is disposed inside the stator 41 to extend in the axial direction of the center axis of the stator 41 (upper-lower direction of FIG. 3). The rotor 43 is fixed to a rotary shall 42 directly coupled to the rotary table 3. Magnets are disposed on the outer periphery of the rotor 43 so as to face the coils of the stator 41. The rotary table 3 is directly coupled to the rotor 43 and the rotary shaft 42 to which the rotor 43 is fixed, and is supported by the bearings 20, 21 so as to be rotatable with respect to the slide table 2A. In the embodiment, when the coils of the stator 41 are energized to rotate the rotor 43, the rotor 43 directly rotationally drives the rotary table 3 directly coupled to the rotor 43 via the rotary shaft 42. The machining center 1A is an example of the machine tool according to the present invention.

Effects of Second Embodiment

With the machining center 1A according to the embodiment, it is not necessary that the rotational drive torque of the motor 40 should be transferred to the rotary table 3 via a speed reduction mechanism since the motor 40 is directly coupled to the rotary table 3. Therefore, it is not necessary to provide an arrangement space for a speed reduction mechanism in the slide table 2A which houses the motor 40. Hence, the size of the slide table 2A can be reduced compared to a case where an arrangement space for a speed reduction mechanism is provided in the slide table 2A, whereby the site of the machining center 1A can be further reduced.

The present invention is not limited to the embodiments discussed above, and part of the configuration of the embodiments may be modified appropriately without departing from the gist of the present invention. In the first embodiment discussed above the rotary table 3 is rotationally driven by the pair of motors 30, 30. However, the present invention limited thereto, and one motor may be disposed in the projecting portion 10, and the rotary table 3 may be rotationally driven by transferring the rotational drive torque of the motor to the gear portion 23 of the rotary table 3 via a belt transfer mechanism or a speed reducer, for example.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A machine tool comprising:
    a slide table supported by an upper portion of a main body of the machine tool so as to be horizontally slidable;
    a rotary table provided on the slide table so as to be rotationally indexable about a vertical axis extending in a direction that is orthogonal to a direction of horizontal slide movement of the slide table;
    a pair of guide rails provided on the main body and disposed opposite to each other on outside of a housing space to support the slide table so as to be horizontally slidable, and
    a pair of motors provided in the slide table to rotate the rotary table, wherein
    the housing space is formed in the main body to house a lower portion of the slide table so that at least a part of the pair of motors provided in the slide table is placed in the housing space,
    the pair of motors are disposed point-symmetrically about the vertical axis to rotate the rotary table, and
    the pair of motors are aligned with one another in the slide table in a direction extending parallel with a sliding direction of the slide table.

2. The machine tool according to claim 1, wherein at least one driving unit, configured to drive the slide table horizontally, is rotatably disposed in the housing space.

* * * * *